Nov. 22, 1927. 1,650,189
A. L. COFFEY
TRAILER HITCH FOR AUTOMOBILES
Filed Nov. 20, 1926  2 Sheets-Sheet 2
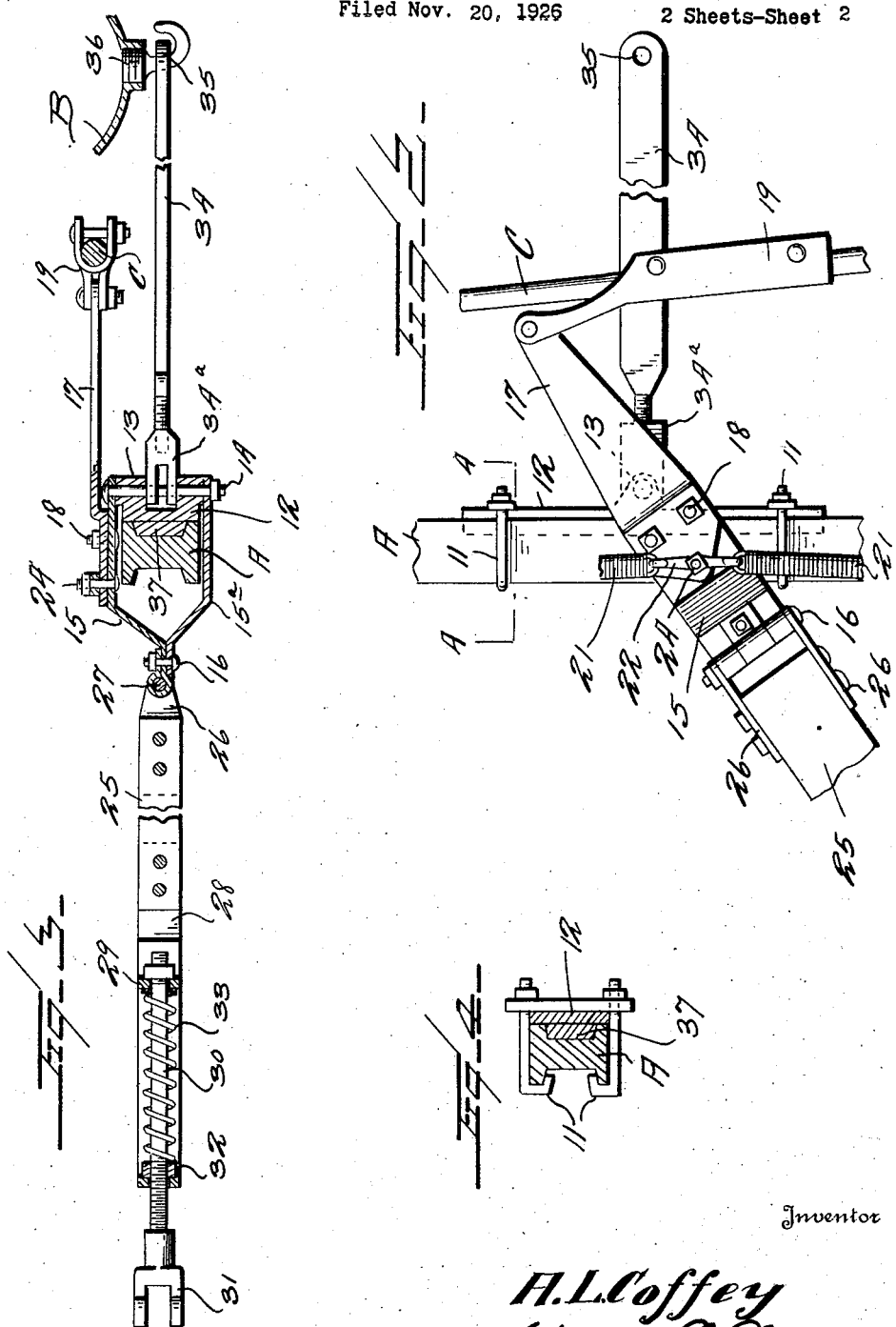
Inventor
A. L. Coffey
By Watson E. Coleman
Attorney Patented Nov. 22, 1927.

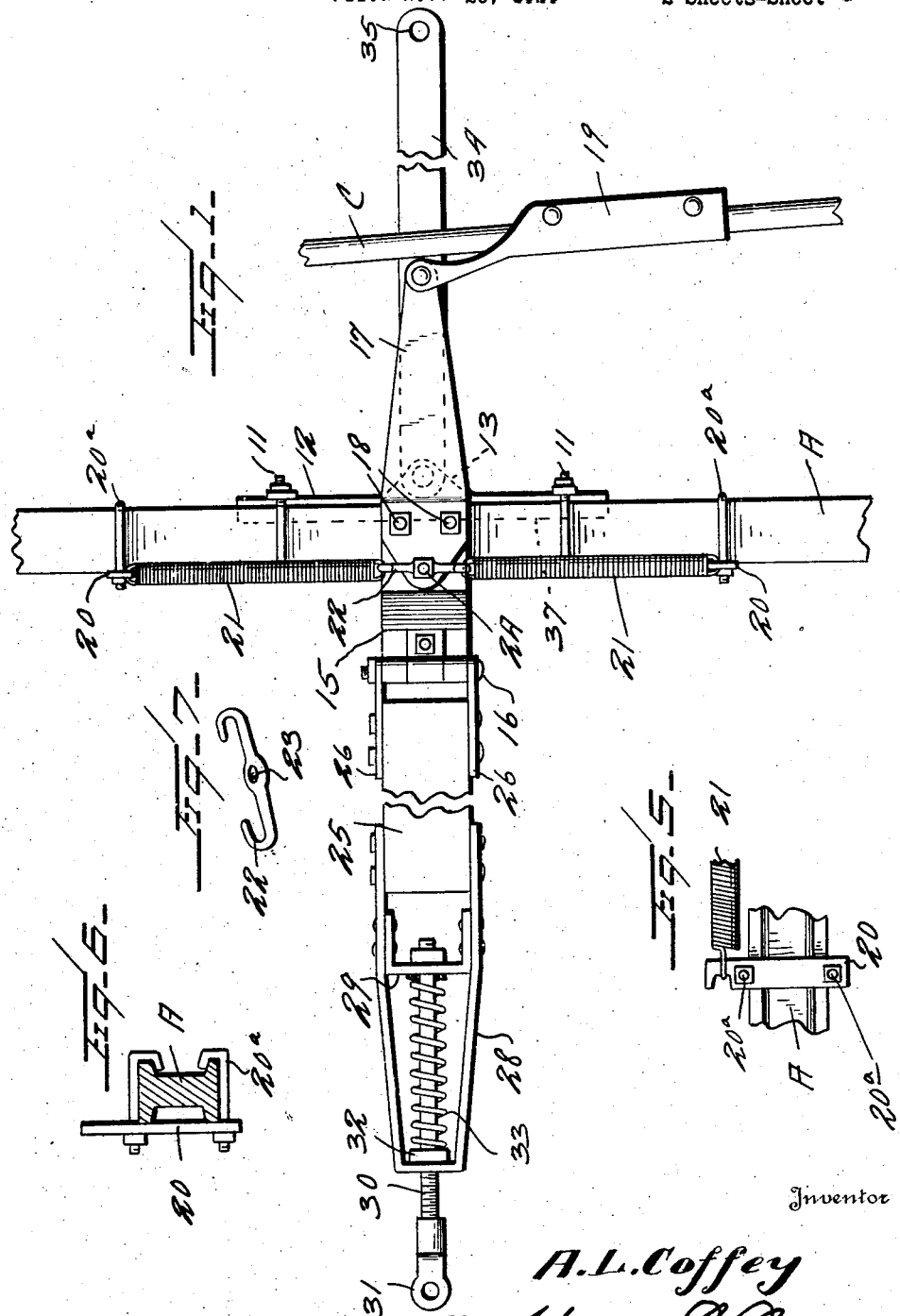

1,650,189

UNITED STATES PATENT OFFICE.

ARVIN LAVILLE COFFEY, OF ANSON, TEXAS.

TRAILER HITCH FOR AUTOMOBILES.

Application filed November 20, 1926. Serial No. 149,694.

This invention relates to towing devices such as are used for towing one car from another or for towing trailers.

The general object of the invention is to provide a hitch of this character which may be easily applied to certain makes of car and which is particularly adapted to Ford cars and whereby the towed car or trailer may be towed without swinging from side to side of the road and thus rendering it difficult to steer the towing car.

Another object is to provide a device of this character which will cause the forward wheels of the trailer to be shifted in accordance with the steering of the car in advance so as to make the towed car trail properly.

Still another object is to provide means for cushioning and yieldingly impeding the forward movement of the trailer when the forward car stops or slackens speed and thus cushioning the jar communicated to the towing car. This movement of the trailer ahead when the towing car checks its speed causes the guiding arm to swing from one side to the other, thus causing the trailer to swing in and out.

A further object is to provide resilient means attached to the guiding arm of the hitch which will prevent or tend to prevent the trailer from swinging in and out upon striking a rut or if the trailer is running on a slippery road where the tendency is to slide to one side.

More specifically my object is to provide means on either side of the guiding arm which will hold it securely in its proper working place and yet yield sufficiently for a proper steering movement to be communicated to the steering wheels of the trailer.

A still further object is to provide means for taking the strain off the radius rods of the towed automobile and another object is to provide means whereby the pull will be equalized against the axle of the towed car.

My invention is illustrated in the accompanying drawings wherein:—

Figure 1 is a top plan view of a trailer hitch constructed in accordance with my invention;

Fig. 2 is a fragmentary top plan view showing the tongue and steering arm shifted;

Fig. 3 is a longitudinal sectional view of the hitch, the section extending through the axle of the car;

Fig. 4 is a section on the line 4—4 of Figure 2;

Fig. 5 is a fragmentary front elevation of the axle and the spring connecting member;

Fig. 6 is a section through the axle showing the member 20 in elevation;

Fig. 7 is a perspective view of the double hook.

Referring to these drawings it will be seen that I have illustrated my device applied to the Ford car which is being towed and to a towing car, and in the drawings A designates the forward or steering axle of the towed car and B the oil pan thereof. Disposed immediately behind the axle and held thereto by the hook bolts 11 is a bar 12 which extends longitudinally of the axle and has the same thickness thereas and is provided with a rearwardly projecting portion 13 through which passes the draft bolt 14. Pivoted upon this bolt and embracing the axle are the top and bottom hitch irons 15$^a$ and 15. These hitch irons are connected at their forward ends by means of the bolt 16 and the draft bolt 14 passes through the rear ends of the upper and lower hitch irons so that these hitch irons are pivoted just rearward of the axle for swinging movement in a horizontal plane. The guiding or steering arm 17 is bolted to these hitch irons by preferably two bolts 18 and extends rearward and is pivotally connected at its extremity to a clip 19 which is adapted to be bolted or otherwise engaged with the transversely extending steering rod C of the car.

Attached to the axle A by bolts or any other suitable means, are the hook members 20 and engaged with these hook members are the coiled contractile springs 21 which at their inner ends are connected to a double hook 22 formed with a medially disposed eye 23 through which the medially disposed bolt 24 passes. This bolt engages this double hook with the upper hitch iron 14 and these springs 21 act to hold the steering arm 17 in a medial position and resisting swinging movement of this steering arm.

Hingedly connected to the forward ends of the upper and lower irons 15 and 15$^a$ is a draft tongue 25. As illustrated, the tongue is provided with two outwardly projecting ears 26 at its rear end and a bolt 27 passes through these ears and through a bead or knuckle formed by the conjoined ends of the irons 15 and 15ᵃ. Thus the tongue may swing in a vertical plane but any movement in a horizontal plane is transmitted to the irons 15 and 15ᵃ and thus to the steering arm 17. The tongue 25 may be made of any suitable material and attached to the forward end of the tongue is a relatively elongated approximately U-shaped yoke 28 which just forward of the tongue carries a transverse brace 29. A draft rod 30 has a head at its inner end and passes through this brace and through the apex of the yoke and carries a clevis 31 at its forward end whereby it may be connected to the towing vehicle. This draft rod carries upon it the collar 32 which bears against one end of a coiled compression spring 33. This spring at its inner end bears against a washer surrounding the rod 30 and bearing in turn against the brace 29. Thus it will be seen that when the rod 30 is stopped in its forward movement as, for instance, by the stoppage of the towing car, the rod 30 will be forced backward relative to the yoke 28 and the spring 33 will be compressed, thus cushioning the impact of the tongue against the car and gradually reducing the forward movement of the trailer.

Bolted at its forward end to the iron 12 or body iron, and particularly to the draft bolt 14, is a draft bar 34. The forward end of this draft bar is provided with a knuckle for engagement by the draft bolt 14 and the rear end of the draft bar is provided with an eye 35. This bar 34 extends rearward to the plug which is found in the bottom of the Ford oil pan and this plug is removed and a special plug 36 is used instead. This plug 36 is screw-threaded for engagement with the pan and its lower end is formed with a hook which may be hooked into the eye 35. This bar 34 is for the purpose of taking off the strain from the radius rods of the towed car. These rods are intended to support the front axle against backward jars and jolts. They are not intended for pulling purposes and by providing the bar 34 the strain is taken off of the radius rods and transmitted to the body of the towed car.

Preferably a filling piece 37 will be disposed within the recess formed in the channel-shaped axle of the car and against which the body 12 will bear, so as to secure a flat bearing for this body.

While I do not wish to be limited to details of construction, preferably the forward end of the draft bolt 30 has the bifurcated head 31, as previously stated. This head 31 preferably has a screw-threaded shank which has screw-threaded engagement with the draft bolt 30 so that the head may be adjusted into any desired relation to the shank. The bar 34 is also provided with a terminal end or head 34ᵃ which has screw-threaded engagement with the bar 34 so as to increase or decrease the effective length of bar 34.

It will be seen that the filler 37 fills up the space between the upper and lower flanges on the rear of the axle and the hooks 11 engage over the front flanges of the axle and extend through the body member 12 or through cross bars extending over this body member, as illustrated. The springs 21 at their outer ends are supported by means of the members 20. These are hook-shaped at their upper ends to support the springs and are attached against the front face of the axle by bolts 20ᵃ of the same general character as the bolts 11.

Attention is particularly called to the fact that the body 12 is disposed against the rear face of the axle and that the hitch irons 15 and 15ᵃ are pivoted to this body 12 directly behind the middle of the front axle so that each iron pulls equally against the axle instead of pulling from a bolt extending upward from or located above the axle.

It will be seen that by the provision of the spring 33, I secure a cushioning action which prevents the trailer from being jammed against the towing car when the towing car slackens speed. Where a stiff tongue is used and the speed of the towing car is checked, the trailer is jammed against the towing car, causing the guiding arm to swing from one side to the other and causing the trailer to swing correspondingly. In my device, the trailer, when the towing car checks its speed, is jammed against the spring 33 instead of against a stiff tongue. By this construction, the guiding arm 17 is not affected at all.

Another important feature of my invention resides in the use of the springs 21. With an ordinary guide arm commonly used, on these draft hitches, if the front wheels of the trailer happen to strike a rut, the trailer will be caused to swing in or out or if the trailer is running on a slippery road, particularly if the roadway is inclined laterally, the same effect is secured. By the provision of the two springs 21, however, one on either side of the guiding arm, the guiding arm is held securely in its proper working position against any sidewise movement due to ruts and as if the trailer was running on a smooth road. As before stated, the provision of the bar 34 takes the strain off the radius rods of the towed car or at any rate reduces this strain very greatly. It will be understood that this draft device is capable of use for towing trailers or for towing other cars and that I do not wish to be limited to its use.

I claim:—

1. A towing hitch comprising a body adapted to be disposed against the rear face of the trailer axle, means for clamping the body to the axle, draft irons embracing the axle and pivotally mounted upon said body for swinging movement in a horizontal plane, a tongue swingingly connected to the forward ends of the draft irons for movement in a vertical plane but swinging with the draft irons in a horizontal plane, a draft bolt carried by the forward extremity of the tongue and whereby the tongue may be connected to a towing car, a spring resisting forward movement of the tongue relative to the bolt, a steering arm connected to the steering irons and having means whereby it may be swingingly engaged with a steering rod of a towed vehicle, and springs resisting lateral swinging movement of the steering irons.

2. A towing hitch of the character described comprising a steering member, means for detachably mounting it in place on the forward axle of a towed car for swinging movement in a horizontal plane, a steering arm carried thereby and extending rearward therefrom and having means whereby it may be pivotally connected to the steering rod of the car, a tongue connected to the steering arm for vertical swinging movement and movement in a horizontal plane with the steering arm and having means at its forward end whereby it may be detachably engaged with a towing car, and springs having means at their outer ends whereby they may be detachably mounted upon the axle of the towed car, said springs being operatively connected with the steering member and yieldingly resisting swinging movement thereof.

3. A towing hitch comprising a body having means whereby it may be mounted upon the rear face of an axle of a towed car, a steering member embracing said body and adapted to embrace the axle, a pivot bolt passing through the body and through said steering member, the steering member having a rearwardly extending arm, means connected to the arm whereby the arm may be pivotally engaged with a steering rod, a tongue swingingly engaged with the steering member for movement in a vertical plane but moving with the steering member in a horizontal plane; a pair of springs resisting movement of the steering member from a middle position and operatively engaged with the steering member and having means at their outer ends whereby the springs may be engaged with the axle.

4. A towing hitch comprising a body having means whereby it may be mounted upon the rear face of the axle of a towed car, a steering member embracing said body and adapted to embrace the axle, a pivot bolt passing through the body and through said steering member, the steering member having a rearwardly extending arm, means connected to the arm whereby the arm may be pivotally engaged with a steering rod, a tongue swingingly engaged with the steering member for movement in a vertical plane and moving with the steering member in a horizontal plane, a pair of springs operatively engaged with the steering member resisting movement of the steering member in either direction from a middle position, and having means at their outer ends whereby the springs may be engaged with the axle, a draw bolt forming part of and passing through the forward end of the tongue and adapted for engagement with the towing vehicle, and a spring surrounding the draw bolt and operatively supported on the tongue and resisting forward movement of the tongue relative to the draw bolt.

5. A towing hitch including a steering member adapted to be operatively pivoted upon the axle of a towed vehicle for movement in a horizontal plane and having a forwardly extending tongue moving in a horizontal plane therewith, means for connecting the steering member to the steering rod of the vehicle, a bolt pivotally supporting the steering member and acting to transmit draft to the axle from the tongue, and a draft bar engaged with said bolt and adapted to extend beneath the towed vehicle and to be detachably engaged therewith.

6. A towing hitch including a steering member adapted to be operatively pivoted upon the axle, of a towed vehicle and having a forwardly extending tongue, means for connecting the steering member to the steering rod of the vehicle, a bolt pivotally supporting the steering member and acting to transmit draft to the axle from the tongue, and a draft bar engaged with said bolt and adapted to extend beneath the towed vehicle, the draft bar having an eye at its rear end, and a plug having a hook engaged in said eye, the plug being formed to take the place of the usual plug in the oil pan of the towed vehicle.

7. A hitch including a body adapted to be supported against the rear face of the axle, a steering member embracing the body and adapted to embrace the axle and extend forward therefrom, a bolt passing through the steering member above and below the body and through said body and through the steering member, a tongue engaged with the steering member for movement in a horizontal plane, means connected to the steering member whereby the movement of the steering member may be transmitted to the steering wheels of the towed car, and a draft bar detachably engaged at its forward end with said bolt, extending rearward therefrom, and formed at its rear end for detachable engagement with the towed car beneath the crank case thereof.

In testimony whereof I hereunto affix my signature.

ARVIN L. COFFEY.